Patented Aug. 12, 1952

2,606,876

UNITED STATES PATENT OFFICE 2,606,876

COMPOSITIONS FOR STABILIZATION OF HERBICIDE CONCENTRATES

Jonas Kamlet, New York, N. Y., and William T. McLaughlin, Pittsburgh, Pa., assignors to Pittsburgh Coke & Chemical Company, Pittsburgh, Pa., a corporation of Pennsylvania No Drawing. Application March 8, 1949, Serial No. 80,327

11 Claims. (Cl. 252—384)

The present invention relates to compositions for addition to concentrated solutions of herbicidal agents, and more particularly, to unitary compositions for addition to weed-killing concentrates to impart to these concentrates stability against clouding and precipitation upon dilution with hard water.

Following the work of Zimmerman (Industrial and Engineering Chemistry, 35, 596–601 (1943)); Cold Spring Harbor Symposia 10, 152–152 (1942); Zimmerman and Hitchcock (Contributions from the Boyce-Thompson Institute 12, 321–343 (1942)); Proceedings of the American Society for Horticultural Science 45, 187–189 (1944); Contributions from the Boyce Thompson Institute 14, 21–38 (1945), and Jones (U. S. Patents 2,390,941 (December 11, 1945); 2,394,916 (February 12, 1946); 2,396,513 (March 12, 1946) and 2,412,510 (December 10, 1946)), a series of new weed-killing compounds were introduced, based on the monochlorinated, di-chlorinated and tri-chlorinated derivatives of aryloxyacetic acids. These weed-killing compounds have met with very widespread acceptance and, at the present time, are used to the extent of many millions of pounds annually throughout the world. These compounds are chiefly 2,4-dichlorphenoxyacetic acid, 2-methyl, 4-chlorphenoxyacetic acid, 2,4,5-trichlorphenoxyacetic acid, 2,4,6-trichlorphenoxyacetic acid and the salts, esters and amides thereof.

The water-soluble salts of these mono-, di- and tri-chlorinated aryloxyacetic acids are usually applied to the weeds, foliage, brush, etc., by spraying an aqueous solution thereof from a gardening can, knapsack sprayer, small tank sprayer, power sprayer, boom rig fitted with spray nozzles, aerial spraying from aircraft, etc. For purposes of convenience in preparing such sprays in the field immediately prior to spraying, it has become customary to sell these chlorinated aryloxyacetic acids in the form of concentrates of a water-soluble salt thereof, said concentrates being diluted to the desired concentration in the field immediately prior to spraying. Thus, a large part of these chlorinated aryloxyacetic acids is now sold as concentrates of the sodium salt, ammonium salt, isopropylamine salt, diethanolamine salt, triethanolamine salt, ethylamine salt, triethylamine salt, triisopropanolamine salt, morpholine salt, etc., said concentrates being diluted with water to the desired concentrations with water (usually between 0.01% and 0.5% based on the chloroaryloxyacetic acid content) immediately prior to spraying.

As is well known, most of the ground water supplied in the United States and throughout the North American continent contains very considerable amounts of calcium and magnesium ions, ranging from several hundred to several thousand parts per million. Areas underlaid by limestone and dolomitic limestone formations produce particularly high concentrations of these ions in the ground water. Thus, when the concentrates of the water-soluble salts of these chlorinated aryloxyacetic acids are diluted with this hard water, there forms immediately a heavy, gelatinous precipitate of the water-insoluble calcium and magnesium salts of the chlorinated aryloxyacetic acids. This precipitate is highly undesirable. It clogs the nozzles of the sprayer and diminishes the effectiveness of the spray since these insoluble salts of the chlorinated aryloxyacetic acids are poorly herbicidal. Occasionally, with very hard water, this gelatinous precipitate sets up so thickly, that the entire solution becomes a semisolid mass which cannot be sprayed. This difficulty represents one of the major practical problems faced by the commercial sprayer, the gardener, horticulturist, farmer, greenskeeper and all other users of weed-killing concentrates in hard water areas.

In our copending application, Serial No. 80,326, filed March 8, 1949, we have described a method for inhibiting this precipitation of concentrates upon dilution with hard water. Preferably, this method involves adding to said concentrates:

(a) A water-soluble salt of ethylene bis-(iminodiacetic acid), in aqueous solution, as a cation-sequestering agent, and (b) A non-ionic surface-active agent, chiefly the polyoxyethylene derivatives of hexitan mono-fatty acid esters.

It is desirable to be able to provide potential users of weed-killing concentrates with a single, unitary solution containing both of the agents required to impart hard water stability to weed-killing concentrates, and in the proper concentrations. Thus, it has been found that most formulators of weed-killing concentrates would prefer to purchase the active weed-killing agent (i. e., the chlorinated aryloxyacetic acid) in bulk, and add thereto the proper amount of water and the proper base for solubilization and a single, unitary stabilizing agent, said stabilizing agent being designed to impart stability to said concentrate upon being diluted with hard water.

The aqueous solution of the water-soluble salts of ethylene bis-(iminodiacetic acid) (i. e., the cation-sequestering agent) and the polyoxyethylene derivatives of the hexitan mono-fatty acid esters (i. e., the surface-active agent) found to be most suitable for the purpose of stabilizing these weed-killing concentrates are mutually insoluble. When these agents are added individually to the weed-killing concentrate, a uniform solution is obtained. However, when these agents are mixed in any designated proportions prior to addition to the weed-killing concentrate, they tend to separate into two, immiscible and mutually insoluble layers. This fact presents a very troublesome problem because it is impractical to sell such a single, unitary stabilizing agent if it tends to separate into immiscible and insoluble layers on standing. Such a unitary stabilizing agent should be a homogeneous solution, all of the components of which are compatible with each other and with the other components of the weed-killing concentrate (i. e., the chlorinated aryloxyacetic acid and the base used for solubilization) and will in no way detract from the stabilization effect of the treated concentrate upon dilution with hard water.

A principal object of this invention is the provision of new compositions of matter which are useful in the preparation of herbicide products and spray solutions thereof. A further object is the provision of new compositions which may be added to concentrated aqueous solutions of water-soluble herbicidal salts so that, upon dilution of the concentrated solutions of these salts with hard water, clouding or precipitation in the diluted solutions is eliminated or greatly inhibited. Another object is the provision of such compositions which are themselves homogeneous and do not separate into a plurality of layers upon standing for an appreciable period of time.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by the formation of a unitary solution of three essential ingredients by mixing together (a) Ethylene bis-(iminodiacetic acid) in the form of a water-soluble salt thereof in aqueous solution, (b) A polyoxyalkylene derivative of hexitan mono-fatty acid ester, and (c) A monohydric, dihydric or trihydric aliphatic alcohol containing no more than four carbon atoms in the molecule.

Such a mixture of three components yields a stable, homogeneous solution. When added to weed-killing concentrates, a stable, homogeneous stabilized weed-killing concentrate is obtained which, upon dilution with hard water, fails to deposit a precipitate for twenty to fifty hours. Since dilutions of these concentrates are usually used the same day as made, it is obvious that this degree of stabilization against precipitation by hard water is more than adequate.

The new products of this invention, their methods of production and the manner in which they are employed in the modification and formation of herbicidal solutions can be more readily understood by reference to the following illustrative example, in which all parts are by weight:

Example

A unitary solution is made by mixing:

2.0 parts by weight of an aqueous solution containing 40% of the ethylene bis-(iminodiacetic acid) neutralized with triethylamine (i. e., the triethylamine salt);

0.5 part by weight of polyoxyethylene sorbitan mono-oleate;

2.5 parts by weight of methanol.

This unitary solution is stable and may be kept as such for a prolonged period without separation into layers. It is used, e. g., by adding 5.0 parts of the unitary solution to 43.0 parts of 2,4-dichlorphenoxyacetic acid, 22.5 parts of 90% technical triethylamine and sufficient water to make 100.0 parts, to form a stable, homogeneous, hard water-compatible weed-killing concentrate.

The resulting concentrate is used in the formation of a dilute herbicidal spray by mixing one part of the concentrate with fifty parts of hard water containing 500 p. p. m. calcium ion. A clear homogeneous solution is easily obtained with a small amount of agitation. The spray is allowed to stand undisturbed and is observed for possible clouding or precipitation, but after a period of two days, the solution remains clear and free from precipitation.

Typical examples of the water-soluble salts of the ethylene bis-(iminodiacetic acid) suitable for the purpose of the present invention include the sodium, potassium, amine, morpholine, and N-methylmorpholine salts.

Typical examples of the polyoxyethylene derivatives of hexitan mono-fatty acid esters suitable include the oleic, stearic, palmitic, lauric, myristic, cocoanut oil fatty acid, tallow fatty acid and tall oil acid esters. (The tall oil acids comprise a mixture of oleic and rosin acids, both of which are equally suitable for the purposes of the present invention.)

Typical examples of the monohydric, dihydric and trihydric aliphatic alcohols suitable for the purposes of the present invention include, in the order of their decreasing effectiveness, methanol, propylene glycol-1,2, butylene glycol-2,3, butylene glycol-2,4, glycerine, alpha-methyl-glycerine, ethanol and isopropanol. Other aliphatic alcohols which may be used include butanol-1, allyl alcohol and ethylene glycol.

The three essential ingredients, as enumerated above, may be used in various proportions to one another and this depends, to some extent, upon the particular reagents used in the products and also to some extent upon the particular herbicidal concentrate which the products are to be used with. However, under all general conditions, using the preferred reagents of this invention, it has been found that unusually good results are obtained using the following proportions of ingredients:

(a) 0.3 to 2 parts of the water-soluble salt of ethylene bis-(iminodiacetic acid);

(b) 0.5 to 5 parts of the hexitan ester, and (c) 0.8 to 40 parts of the aliphatic alcohol.

These figures give the relative proportions of the reagents in the preferred compositions of this invention but do not necessarily express the concentrations of the reagents in the final products, since this may be varied to some extent by the addition of water to a mixture having the above proportions, thus forming a somewhat diluted product.

It appears that the herbicidal solution modifying agents of this invention can be satisfactorily used in conjunction with the formation of spray solutions of any herbicidal agent which does not react with the components of these stabilizing products. However, they are particularly useful in conjunction with halogenated aryloxyacetic acid salts.

While the unitary solution products of this invention are generally composed only of the three essential ingredients, they may be diluted with compatible, small quantities of water. Moreover, they may be modified by the addition of small amounts of dyes or perfumes, if this is desired, for the purpose of providing a more pleasing appearance or nature to the products.

This invention provides new homogeneous mixtures composed predominantly of three components which do not separate to any appreciable extent upon standing or storage for long periods of time. As a result, these new mixtures may be sold as unitary products to formulators of herbicide compositions, providing such purchasers with a complete answer to their requirements for a unitary agent to add to herbicide concentrates so as to impart hard water stability thereto.

We claim:

1. A composition for admixture with concentrated aqueous solutions of herbicides to stabilize said herbicides against precipitation upon dilution of the concentrated solutions with hard water consisting essentially of: (a) between 0.3 and 2 parts by weight of a water-soluble salt of ethylene bis-(iminodiacetic acid), (b) between 0.5 and 5 parts of a polyoxyethylene derivative of a hexitan mono-fatty acid ester, and (c) between 0.8 and 40 parts of an aliphatic alcohol having between 1 and 4 carbon atoms.

2. A composition as claimed in claim 1 wherein said hexitan ester is polyoxyethylene sorbitan monopalmitate.

3. A composition as claimed in claim 1 wherein said hexitan ester is polyoxyethylene sorbitan monolaurate.

4. A composition as claimed in claim 1 wherein said hexitan ester is polyoxyethylene sorbitan mono-oleate.

5. A composition as claimed in claim 1 wherein said water-soluble salt is the sodium salt of ethylene bis-(iminodiacetic acid).

6. A composition as claimed in claim 1 wherein said water-soluble salt is the triethanolamine salt of ethylene bis-(iminodiacetic acid).

7. A composition as claimed in claim 1 wherein said water-soluble salt is the triethylamine salt of ethylene bis-(iminodiacetic acid).

8. A composition as claimed in claim 1 wherein said aliphatic alcohol is methanol.

9. A composition as claimed in claim 1 wherein said aliphatic alcohol is propylene glycol-1,2.

10. A composition as claimed in claim 1 wherein said aliphatic alcohol is butylene glycol-2,3.

11. A composition for admixture with concentrated solutions of herbicides to stabilize said herbicides against precipitation upon dilution of the concentrated solutions with hard water consisting essentially of: (a) 2 parts by weight of the triethylamine salt of ethylene bis-(iminodiacetic acid), (b) one part of polyoxyethylene sorbitan mono-oleate, and (c) 5 parts of methanol.

JONAS KAMLET.
WILLIAM T. McLAUGHLIN.

REFERENCES CITED

The following references are of record in the file of this patent:

UNITED STATES PATENTS

| Number | Name | Date |
|---|---|---|
| 2,240,957 | Munz | May 6, 1941 |
| 2,390,941 | Jones | Dec. 11, 1945 |

FOREIGN PATENTS

| Number | Country | Date |
|---|---|---|
| 598,484 | Great Britain | Feb. 19, 1948 |

OTHER REFERENCES

"Atlas Spans and Tweens," Atlas Powder Co. publication, Wilmington, Del.; reprinted June 1945, 17 pages.